Sept. 29, 1970          W. L. PRIOR          3,531,311
METHOD OF APPLYING GELLED WATER SOLUBLE
COATINGS AS PARTING AGENTS
Filed Oct. 31, 1967          3 Sheets-Sheet 1

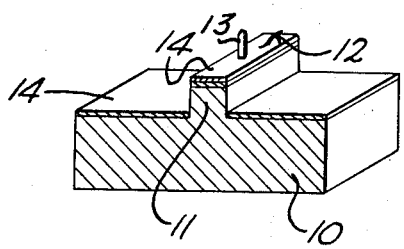

PROVIDE GELLED WATER SOLUBLE COATING (14) ON SURFACE OF SUBSTRATE (10) SOMETIMES ALSO WITH MASK (12) — STEP 1

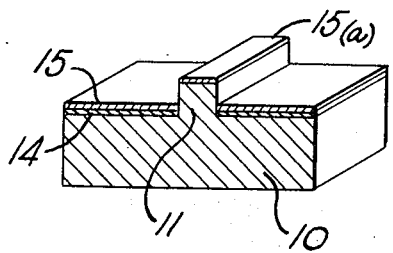

APPLY WATER INSOLUBLE COATING (15) AND (15a) TO SURFACE OF SUBSTRATE (10) AND/OR WATER SOLUBLE COATING (14) — STEP 2

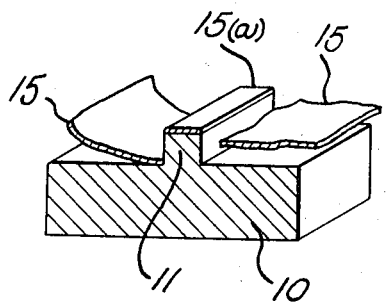

CONTACT COATED SUBSTRATE (10) WITH WATER TO REMOVE GELLED WATER SOLUBLE COATING (14) AND AT LEAST A PART OF WATER INSOLUBLE COATING (15) FROM SURFACE OF SUBSTRATE (10) — STEP 3

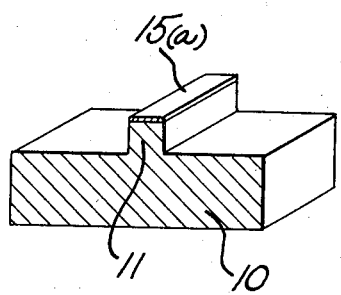

SUBSTRATE (10) WITH WATER INSOLUBLE COATING (15(a)) AND REMOVED WATER INSOLUBLE COATING (15) — STEP 4

FIG. 1

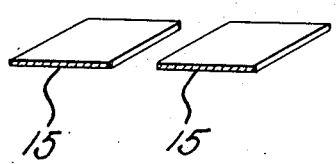

INVENTOR
WILLIAM L. PRIOR
BY
ATTORNEYS

Sept. 29, 1970             W. L. PRIOR             3,531,311
METHOD OF APPLYING GELLED WATER SOLUBLE
COATINGS AS PARTING AGENTS
Filed Oct. 31, 1967             3 Sheets-Sheet 2
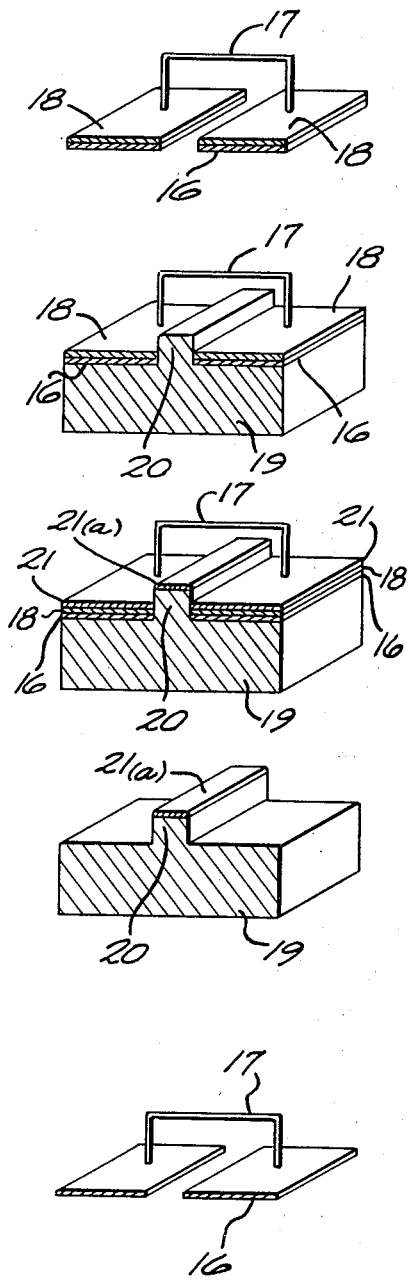
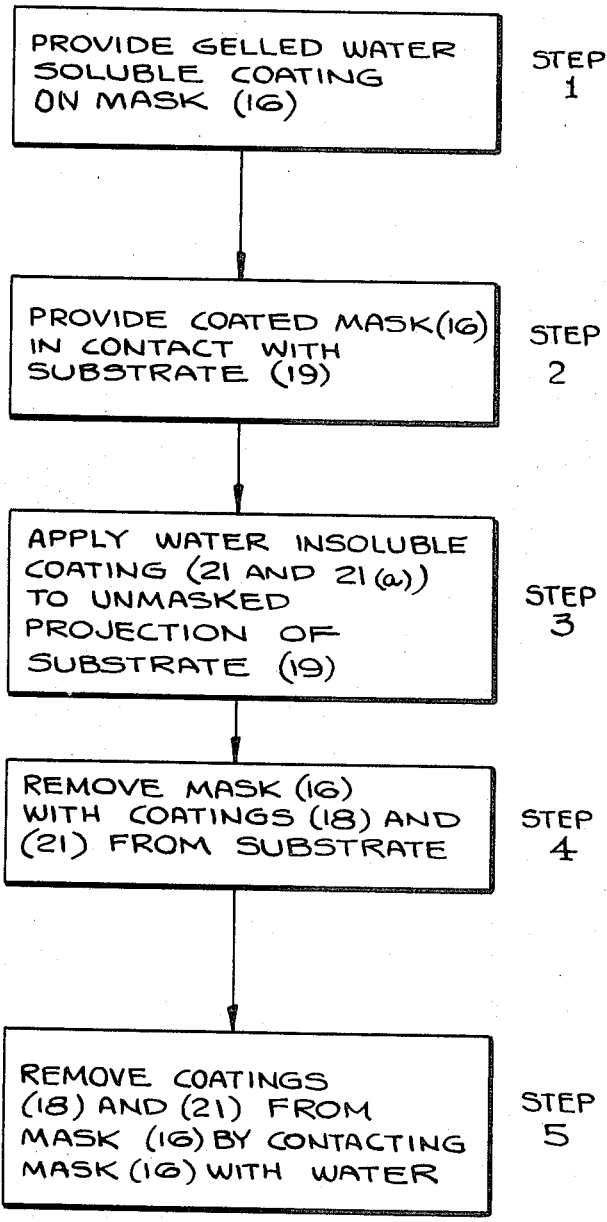
FIG. 2
INVENTOR
WILLIAM L. PRIOR
BY
ATTORNEYS Sept. 29, 1970

W. L. PRIOR 3,531,311

METHOD OF APPLYING GELLED WATER SOLUBLE
COATINGS AS PARTING AGENTS

Filed Oct. 31, 1967

INVENTOR

William L. Prior

BY

*Wilder Morrison Poppas & McLand*

ATTORNEYS

United States Patent Office 3,531,311
Patented Sept. 29, 1970

3,531,311
METHOD OF APPLYING GELLED WATER SOLUBLE COATINGS AS PARTING AGENTS
William L. Prior, Newark, Ohio, assignor to Apyrco, Inc., Newark, Ohio, a corporation of Ohio
Filed Oct. 31, 1967, Ser. No. 679,445
Int. Cl. B44d 1/52, 3/30
U.S. Cl. 117—6                                9 Claims

ABSTRACT OF THE DISCLOSURE

The method of application of aqueous solutions of water soluble materials to various substrates to produce gelled water soluble coatings for use as parting agents is described. Particularly described are gelled water soluble coating compositions used as parting agents for masking means or templates and the like. Both inorganic and organic gelled water soluble coating compositions are described. Gas forming agents admixed in the gelled water soluble coatings which facilitate the solubilization of the gelled water soluble coatings by forming a gas in contact with water at elevated temperatures are described. Improvements in high production coating or paint machines utilizing spray masks are also described.

BACKGROUND OF THE INVENTION

The present invention relates to novel gelled water soluble coating compositions useful as parting agents and to the method of application and use of these water soluble coating compositions as parting agents. In particular the present invention relates to the novel method of use of such compositions on spray masks and to improvements in high production coating or paint machines utilizing the spray masks.

Many liquid or solid parting agents are known to the prior art. One particular class of parting agents which are of direct concern to the present invention are those which prevent the adhesion of various water insoluble compositions to a substrate by providing a barrier between the composition and the substrate. Parting agents of this general class have particularly been used in resin and paint technology. In general these prior art parting agents are either water insoluble when applied to the substrate such as a mold or become insoluble because of subsequent treatment on the substrate and are thus very difficult to remove from the substrate.

Parting agents have been used by the prior art in admixture with various pigment fillers. These parting agents contain materials which soften or melt to facilitate removal of the parting agent composition from the substrate with heated solvents such as hot water. Softeners such as mineral oil, glycerin and wax have been used to maintain the coating in a soft state so that it can be removed with hot water by melting. These coatings dry upon application and become water insoluble thus requiring considerable effort to effectuate their removal. The pigment has been used to prevent paints or other water insoluble coatings from penetrating through the parting agent coating to the surface of the substrate such as a mold or the surfaces of a paint spray booth. In certain instances it has been necessary to use strong alkaline solutions to effect removal of the parting agent with the water insoluble coating from the substrate and in all instances a high pressure solvent spray or scraping is necessary to remove these coatings.

The prior art is well developed in the area of spray masking for the definitive application of paints and the like to the surface of various substrates. High production machinery is commercially available to definitively apply paints and the like through spray masks to various substrates with close tolerances. In order to maintain the initial tolerances of the spray masks they must be cleaned after a few cycles of use in spray painting in order to prevent clogging of and dripping of the paint from the spray mask. This cleaning operation is accomplished in such machinery with various organic solvents which dissolve the paint from the spray mask. These solvents are very volatile, inflammable and present a considerable health hazard to the operator of such machines because of contact of the solvent with the lungs and skin. Hot water or strong alkaline aqueous solutions have been used to melt or chemically dissolve the parting agents to clean the spray mask, but the removal of the paint is slow. The removal of waxes from spray masks is particularly slow and the spray from high pressure spraying of the waxes is carried in the air and deposits where it is not wanted such as on substrates waiting to be painted. Such treatments have not displaced the general use of organic solvents for this reason.

It is therefore an object of the present invention to provide novel parting agent compositions which are truly water soluble as well as to provide a novel method for the application of the water soluble parting agent compositions. It is further an object of the present invention to provide novel improvements in high production coating or painting machines using spray masks and to provide a novel method for the use of water soluble parting agent compositions with spray masks. Further still it is still an object of the present invention to provide a method and machinery for the cleaning of spray masks which is simple and economical and which eliminates the hazards from the use of organic solvents by the methods of the prior art by allowing the use of water with rapid and complete removal of paint and the like from spray masks. These and other objects will become increasingly apparent to those skilled in the art and by reference to the following drawings.

In the drawings:

FIG. 1 is a schematic view of the method of the present invention illustrating the steps in the use of a water soluble coating composition as a parting agent and particularly illustrating the use of a mask for the definitive application of water soluble and water insoluble coatings to selected portions of a substrate.

FIG. 2 illustrates a schematic view of the method of the present invention illustrating the steps using a water soluble coating on a spray mask for the definitive application of a water insoluble coating to the surface of a substrate.

GENERAL DESCRIPTION

Figure 3:
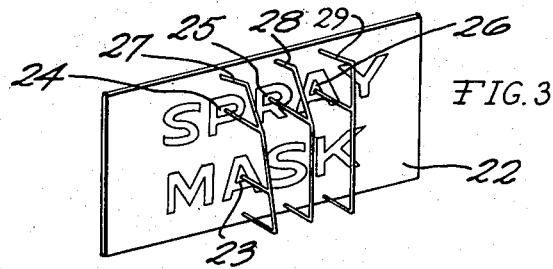
FIG. 3 is a front projection view illustrating a spray mask as conventionally fabricated by the prior art defining openings for the definitive application of paint spray through the openings in the spray mask onto a substrate in contact with the spray mask.

The present invention relates to a novel parting agent composition which comprises in admixture (a) an aqueous solution of a water soluble material which upon application to a solid surface and removal of some of the water forms a gelled water soluble coating, and (b) a gas forming agent in an amount sufficient to increase the rate of solubilization of the gelled water soluble coating by forming a gas in contact with an aqueous solution at elevated temperatures. In particular the present invention relates to a parting agent composition for applying the aqueous solution of the water soluble material to form a uniform gelled water soluble coating on a solid surface repellent to the adherence of aqueous solutions which in addition incorporates a wetting agent dissolved in the aqueous solution which promotes the adhesion of the aqueous solution on the repellent solid surface to form the uniform gelled water soluble coating, the wetting agent being soluble in and reducing the surface tension of the aqueous solution of the water soluble material so that the composition wets the repellent solid surface upon application. In addition the present invention relates to the method for the application of a uniform gelled water soluble coating on a solid surface which comprises: (a) applying to the surface an aqueous solution of a water soluble material which forms a gelled water soluble coating upon removal of some of the water and (b) removing some of the water from the water soluble material to form a gelled water soluble coating on the surface. In addition the present invention relates to the method of removably applying a water insoluble composition to the surface of a solid to which the water insoluble composition is adherent which comprises (a) applying an aqueous solution of a water soluble material which forms a gelled water soluble coating to the surface of a solid, and (b) removing some of the water from the water soluble material to form a gelled water soluble coating on the surface, and (c) applying a water insoluble composition on the water soluble coating composition, the water insoluble composition being removable with water from the surface of the solid by solubilization of the water soluble surface coating.

The present invention particularly relates to the method for the definitive application of an adherent water insoluble coating to the surface of a substrate with a reusable masking means which comprises: (a) providing a substrate which is to be coated on certain portions of the surface with an adherent water insoluble coating; (b) providing in contact with the substrate reusable masking means with an opening defining the surface of the substrate to be coated with the water insoluble material, the surface of the masking means being coated with a gelled water soluble coating; (c) applying the water insoluble coating as a liquid to the substrate through the opening in the masking means and onto the water soluble coating on the masking means so as to provide the definitive application of the water insoluble coating on the surface of the substrate; and (d) contacting the masking means with water to remove the gelled water soluble coating and water insoluble coating from the masking means for reuse. The present invention also relates to improvements in high production machines for the definitive application of a water insoluble coating composition as a liquid to the surface of a substrate through masking means in contact with the substrate with an opening which defines the surface of the substrate to be coated and masking the remaining surface of the substrate which comprises (a) means for applying to the masking means an aqueous solution of a water soluble material which forms a gelled water soluble coating upon removal of some of the water and which prevents the adherence of a water insoluble coating to the masking means; (b) means for removing some of the water from the aqueous solution of the water soluble material to form the gelled water soluble coating; and (c) means for aqueously removing the water insoluble and gelled water soluble coatings from the masking means.

An important feature of the present invention is that the aqueous solutions of the water soluble materials form a gelled water soluble coating on the surface of the substrate to be masked. As used herein the term "gelled" means that the water soluble coating composition consists of a colloidal solution of a liquid phase in a solid phase. The liquid phase of the coating is water and the solid phase is the water soluble material which forms a hydrated solid by the removal of water. Unexpectedly it has been found that this is a means for forming parting agent compositions which are truly water soluble. Thus it has been found that parting agents comprised of water and water soluble ureas; alkali metal silicates, such as sodium and potassium silicate; water soluble starches; solutions of sugars; such as corn syrup or molasses; glassy phosphates; casein; polyvinyl formals; water soluble urethanes, water soluble polyvinyl alcohols; and various water soluble gelatinous materials can be used in the method of the present invention. Numerous other like materials will occur to those skilled in the art and are useful in the present invention so long as the aqueous solutions form gelled water soluble coatings.

The water soluble materials are applied to the surface of a substrate to be masked as an aqueous solution and then some of the water is removed to form a gelled water soluble coating. The gelled water soluble coatings can then be used as parting agents.

In many instances the surface of the substrate to be coated with the gelled water soluble coating is repellent to the adherence of aqueous solutions so that the aqueous solution of the water soluble material must be applied as a relatively thick film in order to insure complete masking of the substrate. This has been found to be disadvantageous where close tolerances must be maintained on the surface to be masked such as where definitive application of a water insoluble material is necessary through a template to the surface. Unexpectedly it has been found that by providing known wetting agents in the aqueous solution of the water soluble material prior to application to the substrate that a uniform thin film of the gelled water soluble coating is formed. These wetting agents are used in small amount and are soluble in and reduce the surface tension of the aqueous solution of the water soluble material so that the aqueous solution of the water soluble material wets the repellent surface upon the application. A large number of wetting agents for accomplishing wetting of a surface are known to the prior art.

An important preferred feature of the present invention is the use of a gas forming agent in the aqueous solution of the water soluble material in an amount sufficient to increase the rate of solubilization of the gelled water soluble coating by forming a gas in contact with an aqueous solution at elevated temperatures. It has been found that the dissolution of the gelled water soluble coating with the gas forming agent is very rapid even in those instances where there is limited surface contact of the gelled water soluble coating with the heated water due to the presence of a water insoluble covering on the gelled water soluble coating. Thin film water insoluble coatings such as dried paints are rapidly removed from the surface of a substrate using heated water which volatilizes the gas forming agent. Thus inorganic and organic gas forming agents such as hydrogen peroxide; alkanes including hexane, isohexanes, heptane; halohydrocarbons including methylene chloride, trichloroethylene, dichloroethylene and fluorocarbons; aromatics including benzene; and alcohols which have a volatilization point between about 75° F. to 212° F. have been used with good result when incorporated in small amounts in the gelled water soluble coatings. Particular care must be taken in selection of the gas forming agents that they do not rapidly evaporate from the gelled water soluble coatings at ambient temperatures and that they are not solvents for the water insoluble compositions. It has been particularly found that chlorofluorohydrocarbons are particularly desirable as gas forming agents for these reasons.

When organic gas forming agents are used in the gelled water soluble coatings of the present invention it has been found that small amounts of emulsifying agents for the organic gas forming agents are preferred to maintain a good dispersion of these organic materials in the aqueous solution of the water soluble material. It has been found that lipophilic emulsifiers such as lauric acid, or oleic acid and their esters are particularly useful for dispersing small amounts of the gas forming agents in these aqueous solutions.

As can be seen from the foregoing description, the present invention is broadly based upon the fact that the water insoluble coatings, being immiscible with water, will not penetrate the gelled water soluble coatings because of the presence of the water in the gelled water soluble coatings. It can thus be seen that should the coatings be dried, so that the water is substantially removed, they would not be useful for the purposes of the present invention as parting agents. Within this limitation the steps of the method of the present invention are broadly set forth in Steps 1 to 4 shown in FIG. 1.

Referring to FIG. 1 in Step 1, a gelled water soluble coating 14 is provided on the surface of a substrate 10. A mask 12 with a handle 13 is shown mounted over a projection 11 integral with the substrate 10. The gelled water soluble coating 14 is also provided on the mask 12. The aqueous solution of the water soluble material which forms the gelled water soluble coating 14 is applied by spraying, brushing or other conventional application techniques and then some of the water is removed by evaporation. In Step 2 the mask 12 has been removed thereby exposing the surface of the projection 11 on the substrate 10. A water insoluble coating 15 and 15a is applied to the surface of the gelled water soluble coating 14 and to the exposed surface of the substrate 10 on the projection 11. The gelled water insoluble coating is a paint, resin or other water insoluble coating material which is adherent to the surface of the projection 11 and forms water insoluble coating 15a. Step 3 is to contact the coatings 14, 15 and 15a on the substrate 10 with water to remove the water soluble coating 14 and at least a part of the water insoluble coating 15 from the surface of the substrate 10. The water insoluble coating 15a remains adhered to the projection 11 of the substrate 10, but the water insoluble coatings 15 are removed and come off as sheets if they are of sufficient thickness. In Step 4 the substrate 10 is produced with the water insoluble coating 15a adhered to the surface of projection 11 of the substrate 10 and the water insoluble coatings 15 are completely removed.

Having generally described the present invention the following is a specific description.

SPECIFIC DESCRIPTION

As can be seen from FIG. 1, the method of the present invention can be used to definitively coat the surface of a substrate such as the water insoluble coating 15a on the surface of the projection 11 of the substrate 10. More specifically the method can be used to completely mask the surface of the substrate 10 as in the case where the substrate 10 is in itself a mask defining openings to a second substrate. This method is illustrated in FIG. 2.

Referring to FIG. 2, Step 1 is to apply a water soluble coating 18 to a mask 16. The mask 16 is provided with a connecting bridge 17 made of steel wire or like material in order to maintain the opening 16a in the mask 16. The mask 16 can be composed of any suitable material but is generally fabricated from a metal such as steel, beryllium, copper, or brass. The gelled water soluble coating 18 is applied in a conventional manner preferably by spraying an aqueous solution of the water soluble material. Step 2 is to provide the mask 16 with the coating 18 in contact with a substrate 19 with a projection 20 such that the surface of the projection 20 is exposed. Step 3 is to apply a water insoluble coating 21 to the unmasked projection 20 on the substrate 19 thereby forming an adherent water insoluble coating 21a on the projection 20. Spray application results in coating the mask 16 with a water insoluble coating 21 which is deposited on the surface of the gelled water soluble coating 18. Step 4 is to remove the mask 16 with coatings 18 and 21 from the substrate, thereby producing a substrate 19 with a water insoluble coating 21a only on the projection 20. Step 5 is to remove the coatings 18 and 21 from the mask 16 by contacting the mask 16 with water, by dissolving the water soluble material in the gelled water soluble coating. In order to speed up the process of the removal it is preferred to use hot water or steam. The mask 16 is then allowed to dry and the aqueous solution of the water soluble material is reapplied to repeat the method.

The method shown in FIG. 2 can be preformed manually but in general it is preferred to adapt currently available high production spray machines to perform the method. FIG. 3 shows a conventional spray mask and FIGS. 4, 5 and 6 illustrate one type of improved machinery of the present invention for this purpose.

FIG. 3 illustrate a conventional spray mask 22 made of steel or like material with openings 23 defining the words "Spray Mask." Bridges 27, 28 and 29 are provided to support the center portion of the letter P 24, the center portion 25 of the letter R and the center portions of the letters A 23 and 26. In general conventional spray FIG. 3 illustrates a conventional spray mask 22 made illustrated in FIG. 3, but in principle their construction is the same.

Figure 4:
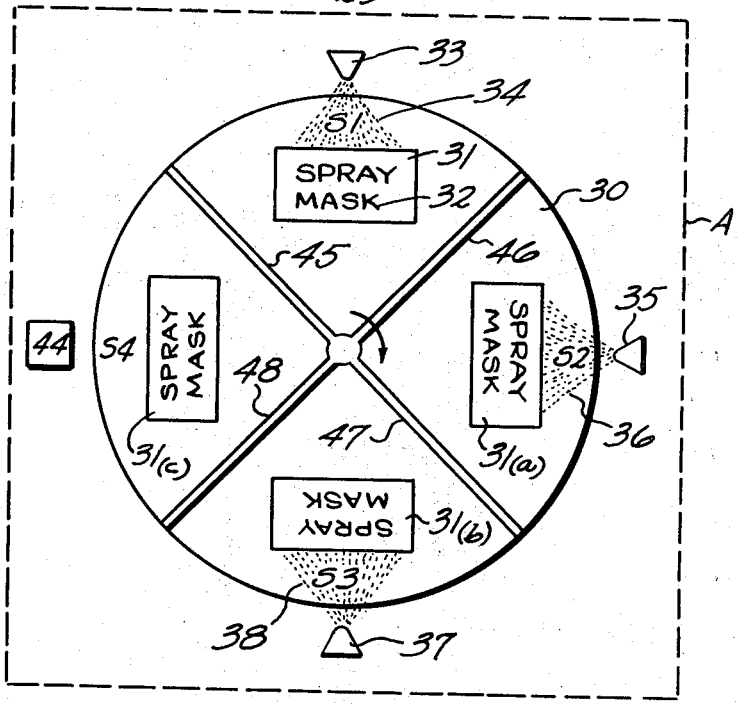
FIG. 4 is a plan view of an improved machine with a conventional indexing table and with spray masks mounted at four stations thereon and particularly illustrating stations with means for paint spraying, cleaning, and application of the water soluble coating compositions used as a parting agent for the spray mask.
Figure 5:
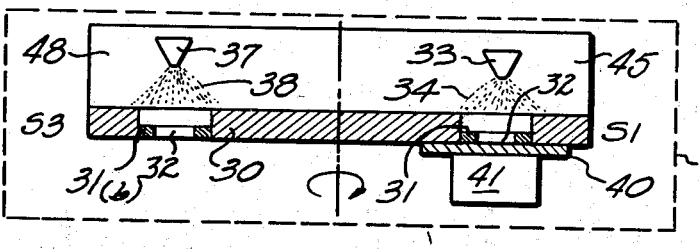
FIG. 5 is a front view of the improved machine and indexing table shown in FIG. 4 illustrating two opposing stations for paint spraying and application of the water soluble coating composition to a spray mask as a parting agent.
Figure 6:
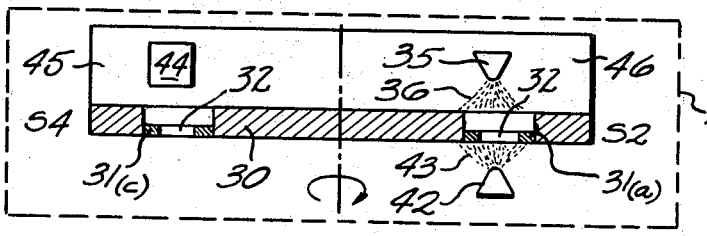
FIG. 6 is a front view of the improved machine and indexing table shown in FIG. 4, particularly illustrating the two remaining opposing stations with the means for cleaning the spray mask with water and means for the removal of at least some of the water from the water soluble coating composition parting agent after application to the spray mask as shown in FIG. 5.

FIGS. 4, 5 and 6 illustrate the improved machine with a spray mask 31 such as the spray mask 22 shown in FIG. 3, mounted at four stations S1, S2, S3 and S4 on a horizontally oriented conventional indexing table 30. The spray mask 31 is provided with openings 32 defining the words "Spray Mask". The letter A designates a cabinet or like housing for the improved machine. Referring to S1, a clean spray mask 31 is provided over a part 40 for definitive application of the words "Spray Mask" through the openings 32. Feed machinery 41 is provided for the part 40 in order to repetitively sequence parts 40 beneath the spray mask 31. Disposed above the spray mask 31 is a paint 34 spray unit 33 which is actuated remotely by the operator. The spray mask 31 may be used several times in the first station before becoming clogged with the paint 34. Upon clogging of the mask 31, the table 30 is indexed to S2 either manually or automatically by the operator, and clean spray mask 31c is positioned under the paint 34 spray unit 33. At S2, hot water sprays 36 and 43 from spray units 35 and 42 are impinged upon the coated mask 31b and the accumulated paint 34 and the gelled water soluble coating 38 is removed by the water spray 36 and 43. It is preferred that hot water be used to remove the paint 34 and gelled water soluble coating 38 in order to heat the spray mask 31a so that an aqueous solution of a water soluble material will rapidly gell at S3. At S3 the heated spray mask 31b is coated on the top surface with a gelled water soluble coating 38 using a spray unit 37 to apply an aqueous solution of a water soluble material. In general it is necessary to coat only the top of the spray mask 31b with the gelled water soluble coating 38, since this is the direction of application of paint 34 at S1. At S4 the spray mask 31c is contacted with hot air by a blower 44 for a sufficient length of time to gell the aqueous solution of the water soluble material by the removal of some of the water but not to dry the water soluble coating 38. The spray mask 31c is then recycled to S1 for reuse.

In general the operation of the improved machine shown in FIGS. 4, 5 and 6 is considered to be automatic even though requiring actuation of the indexing table 30 by the operator. It is possible however to adjust the machine for automatic sequencing based upon one or more applications of paint 34 through the spray mask 31.

It is preferred, although not mandatory, to provide shields 45, 46, 47 and 48 to prevent interference of operations at S1 to S4 with each other. Various pieces of electrical equipment can be included to accomplish indexing of the table 30 and positioning of the part 40 with positioning means 41 as is known in the prior art. Drain systems (not shown) are provided particularly at S2 and S3 as is conventionally known in machinery of this kind using organic solvents. It is also to be pointed out that the indexing table 30 can be disposed vertically with means for unlatching the spray mask 31 so that it can be disposed horizontally for application of the paint 34. This modification is also known in the prior art.

Having described the compositions method and equipment of the preferred equipment of the present invention the following are examples of these features of the present invention. Example 1 illustrates the use of an inorganic water soluble material.

Example 1

A steel plate measuring about 3″ by 4″ and 1/16″ thick was used as the substrate for the purpose of determining the release of paint from the surface of the plate by interposing a gelled water soluble coating. The steel plate had an effective surface on one side of 11.64 square inches. A container of water with heating means and a thermometer was provided. Further an aqueous solution of a water soluble material as hereinafter described was provided in a second container at room temperatures.

The aqueous solution of the water soluble material was prepared from sodium silicate (300 parts by weight of a water solution of sodium silicate containing 44.1 percent solids) with a weight ratio of 2.0 parts silica to 1.0 part alkali. One percent (1%) by weight (3 parts by weight) of a wetting agent (Tergitol 08$_{T.M.}$) was provided in admixture in the aqueous solution.

The unheated metal plate was dipped into the aqueous solution of the water soluble material and drained for 30 seconds to coat the plate. One surface of the metal plate was then spray painted with a conventional epoxy paint which was immediately stripped in the hot water at 150° F. The paint film was very rapidly and completely released from the metal plate but the water soluble coating was not sufficiently gelled on the metal plate and the paint caused the water soluble coating to run badly due to the incomplete gellation of the coating.

In an attempt to overcome the problem of the running of the water soluble coating, the metal plate was dipped in the aqueous solution of the sodium silicate and then aid dryed in contact with air from a fan. The metal plate thus coated with the water soluble material which was air dried was spray painted with the epoxy paint which was allowed to air dry. The metal plate was then placed in hot water at 150° F. and it was found that there was poor stripping of the paint from the surface of the metal plate. It was thus found that if the water soluble coating was more completely dried that the removal of the paint film was much more difficult, however when the air drying with the fan was repeated and the metal plate was placed in the hot water bath at 210° F., the paint stripped clean in 20 seconds.

It was also found that if the water soluble material coating was dried at elevated temperatures for more complete removal of the water from the water soluble material coating that the films were inoperative as parting agents because of the perviousness of the coating which was no longer gelled because of lack of water.

It was found that if the sodium silicate water soluble material coating was air dried for 15 minutes the paint stripped in 52 seconds with hot water at 190° F. It was also found that 150° F. air drying for 3 minutes produced paint films which stripped in about 50 seconds with hot water at 190° F.

Example 2

The procedure of Example 1 was repeated using the same aqueous sodium silicate solution to which was added 2 percent (6 parts by weight) by weight of a gas forming agent consisting of 85 percent by weight tetrachlorodifluoroethylene having a boiling point of 199° F. and 15 percent by weight methanol which lowered the boiling point of the mixture to about 180° F. and ½ percent by weight of the mixture of an emulsifying agent by weight which was oleic acid. The solution was carefully mixed to insure the blending of the ingredients.

As in Example 1 the water soluble silicate film was air dried at 150° F. for 3 minutes and it was found that the paint film which was applied was stripped in water at 190° F. in times ranging from 15 seconds to 20 seconds. It can thus be seen that the gas forming agent reduces the time for the stripping or removal of the paint film by about one-half.

It was found that the selection of a wetting agent depended upon the particular water soluble material used in the compositions of the present invention and the effective wetting agents can easily be determined in the manner set forth in the following Example 3. The following Example 3 also illustrates the particular wetting soluble materials.

Example 3

An aqueous solution of sodium silicate containing 40 percent solids with a ratio of 1.6 part silica to 1.0 part alkali by weight was used and 50 grams was mixed with 0.5 gram wetting agent and poured into a dry aluminum dish. The percentage of the area of the aluminum dish wetted was visually determined upon swirling the aqueous solution in the dish and placing the dish at a 90 degree angle. In general it was found that 1 percent by weight of a wetting agent was sufficient to determine the effectiveness of the wetting agent in wetting metals such as aluminum. Excellent wetting was classified as 100 percent dish area wetted at the end of five minutes drainage at the 90 degree angle. The results are shown in Table 1.

TABLE 1

| | Wetting agent [2] | Percentage wetting agent | Chemical composition and classification | Area wetted, percent | Remarks |
|---|---|---|---|---|---|
| 1 | Blank | 0 | | 20 | Poor. |
| 2 | Alrosol-C | ½ | Fatty alkylol amide condensate nonionic | 30 | Do. |
| 3 | do | 1.0 | do | 50 | Do. |
| 4 | Alrosol-B | [1] ½ | 85% concentrated-nonionic | 70 | Good. |
| 5 | do | 1.0 | do | 80 | Do. |
| 6 | Tergitol 08 | ½ | 40% sod. 2 ethylhexyl sulfate anionic | 90 | Excellent. |
| 7 | do | 1.0 | do | 100 | Do. |
| 8 | Tergitol 04 | ½ | 26% sod. tetradecyl sulfate anionic | 70 | Fair. |
| 9 | do | 1.0 | do | 80 | Good. |
| 10 | Tergitol NPX | ½ | Nonyl phenol polyethylene glycol nonionic | 50 | Fair. |
| 11 | do | 1.0 | do | 60 | Do. |
| 12 | Pluronic L103 | ½ | Polyols | 50 | Do. |
| 13 | do | 1.0 | do | 50 | Do. |
| 14 | Pluronic F68 | ½ | do | 20 | Poor. |
| 15 | do | 1.0 | do | 20 | Do. |
| 16 | Pluronic F68LL | ½ | do | 20 | Do. |
| 17 | do | 1.0 | do | 20 | Do. |
| 18 | Pluronic L101 | ½ | do | 50 | Fair. |
| 19 | do | 1.0 | do | 50 | Do. |
| 20 | Pluronic L61 | ½ | do | 70 | Do. |
| 21 | do | 1.0 | do | 70 | Do. |
| 22 | Pluronic L72 | ½ | do | 30 | Poor. |
| 23 | do | 1.0 | do | 30 | Do. |
| 24 | Pluronic L92 | ½ | do | 30 | Do. |
| 25 | do | 1.0 | do | 30 | Do. |
| 26 | Amm. lauryl sulfate | ½ | do | 0 | No good. |
| 27 | do | 1.0 | do | 0 | Do. |
| 28 | Emcol P1049 | [1] ½ | Alkyl aryl sulfonate anionic | 90 | Excellent. |
| 29 | do | 1.0 | do | 100 | Do. |
| 30 | Emcol T60 | ½ | Nonyl phenol ethylene oxide adduct | 10 | No good. |
| 31 | do | 1.0 | do | 10 | Do. |
| 32 | Emcol P1059 | ½ | Alkyl aryl sulfonate anionic | 80 | Good. |
| 33 | do | 1.0 | do | 80 | Do. |
| 34 | Atmos 300 | ½ | Mono-diglyceride of fatty acids | 0 | No good. |
| 35 | do | 1.0 | do | 0 | Do. |
| 36 | Alrosol C | ½ | Fatty alkylol amide condensate-nonionic | 60 | Fair. |
| 37 | do | 1.0 | do | 70 | Do. |
| 38 | Alrosol B | ½ | 85% concentrated-nonionic | 90 | Excellent. |
| 39 | do | 1.0 | do | 100 | Do. |
| 40 | Prell shampoo | ½ | Detergent | 70 | Fair. |
| 41 | do | 1.0 | do | 70 | Do. |
| 42 | Arlacel 83 | ½ | Sorbitan sesquioleate | 25 | Poor. |
| 43 | do | 1.0 | do | 25 | Do. |
| 44 | Tween 60 | ½ | Polysorbate 60 | 5 | Do. |
| 45 | do | 1.0 | do | 5 | Do. |
| 46 | Span 85 | ½ | Sorbitan trioleate | 30 | Fair. |
| 47 | do | 1.0 | do | 30 | Do. |
| 48 | Span 60 | ½ | Sorbitan monostearate | 0 | Poor. |
| 49 | do | 1.0 | do | 0 | Do. |
| 50 | Span 65 | ½ | Sorbitan tristearate | 0 | Do. |
| 51 | do | 1.0 | do | 0 | Do. |
| 52 | U.C. L76 | ½ | Nonionic organo-silicone surfactant | 20 | Do. |
| 53 | U.C. L76 | 1.0 | do | 20 | Do. |
| 54 | U.C. L77 | ½ | do | 60 | Fair to good. |
| 55 | U.C. L77 | 1.0 | do | 60 | Do. |
| 56 | U.C. L78 | ½ | do | 10 | Poor. |
| 57 | U.C. L78 | 1.0 | do | 10 | Do. |
| 58 | U.C. L79 | ½ | Cationic quaternary organo silicone | 100 | Excellent. |
| 59 | U.C. L79 | 1.0 | do | 100 | Do. |
| 60 | U.C. L520 | ½ | Organo silicone copolymer surfactant | 10 | Poor. |
| 61 | U.C. L520 | 1.0 | do | 10 | Do. |
| 62 | U.C. L522 | ½ | do | 0 | Do. |
| 63 | U.C. L522 | 1.0 | do | 0 | Do. |
| 64 | U.C. L531 | ½ | do | 10 | Do. |
| 65 | U.C. L531 | 1.0 | do | 10 | Do. |
| 66 | U.C. L5320 | ½ | do | 0 | Do. |
| 67 | U.C. L5320 | 1.0 | do | 0 | Do. |
| 68 | U.C. L5310 | ½ | do | 0 | Do. |
| 69 | U.C. L5310 | 1.0 | do | 0 | Do. |
| 70 | UC. L521 | ½ | do | 0 | Do. |
| 71 | U.C. L521 | 1.0 | do | 0 | Do. |

[1] Alrosol B, separated on standing; Emcol P1049, separated on standing.
[2] All of the wetting agents are listed by trademark and are well known in the art.

It was found that the procedure of Example 3 was a simple and effective means for determining wetting agents to be used with a particular water soluble material and with a particular substrate whether metal, resin or ceramic. The selection of particular wetting agents is easily within the skill of the art and they are for instance listed extensively in a handbook entitled "Detergents and Emulsifiers" by John W. McCutheon Inc., New York, N.Y. (1967).

It was found that the wetting agents which were particularly effective were Alrosol B and C which is anionic; Tergitol 08 which is anionic; Tergitol 4 which is anionic; Pluronic L 61 which is nonionic; Emcol P 10 49 and 59 which are anionic; L 79 and L 77 which are nonionic; and Benex 2A1 solution which is anionic. As can be seen from Table 1, numerous conventional wetting agents did not work or the results were poor with the chemical compositions and loading indicated.

Illustrative of other water soluble coating materials particularly organic water soluble materials is the following Example 4.

Example 4

A water soluble urea formaldahyde resin containing a base to make the urea more water soluble was used. An aqueous solution of a water soluble material containing 300 parts by weight of aqueous solution of the urea with 56 percent solids by weight, 3 parts by weight Alrosol C wetting agent and 6 parts by weight gas forming agent was prepared. The urea was diluted with water to form the solution and ammonium hydroxide was added to adjust the pH to between 8 and 9. It was found that without adjusting pH of this resin as received the results were only fair. The gas forming agent was a mixture of tetrachlorodifluoroethylene 85% by weight with 15% by weight methanol to reduce the boiling point to about 180° F. and ½ percent by weight of the mixture of lauric acid.

The procedure of Example 2 was repeated and it was found that the water soluble ureas were very effective in stripping the paint film and with the gas forming agent. The paint films were removed in about 5 to 25 seconds whereas without the gas forming agent the films were removed in about 50 seconds at 190° F.

It was found that it was preferred to apply the water soluble material compositions to the metal plate by heating the metal plate or the composition to a temperature sufficient to insure adequate gelling of the water soluble material coating. In the case of the compositions in Examples 2 and 4, this temperature had to be less than that at which the gas forming agent formed a gas and in the case of Examples 2 or 4 this was preferably 150° F. to less than 170° F.

The effective wetting agents for the effective urea resins was determined in the manner of Example 3 as shown in the following Example 5.

Example 5

A 50 gram sample of the aqueous solution of the urea of Example 4 (56% solids) was weighed into a five ounce cup and various percentages of wetting agents based upon the total weight of the urea were added to the urea and mixed. A 3 gram aliquot sample to be tested was placed in the aluminum cup as used in Example 3. The aqueous solution was swirled around in the dish, the dish was then placed at a 90° angle.

TABLE 2

| | Wetting agent | Percentage on total weight | Chemical composition and classification | Area wetted in cup, percent | Remarks |
|---|---|---|---|---|---|
| 1 | Control | 0 | None | 0 | No good. |
| 2 | Alrosol C | ½ | Fatty alkylol amide condensate nonionic | 50 | Good. |
| 3 | do | ½ | do | 100 | Excellent. |
| 4 | do | 1.0 | do | 100 | Do. |
| 5 | Alrosol B | ½ | 85% concentrated-nonionic | 15 | Poor. |
| 6 | do | 1.0 | do | 25 | Do. |
| 7 | Teigitol 08 | ½ | 40% sod. 2 ethylhexyl sulfate anionic | 0 | No good. |
| 8 | do | 1.0 | do | 0 | Do. |
| 9 | Tergitol 4 | ½ | 26% sod. tetradecyl sulfate anionic | 0 | Do. |
| 10 | do | 1.0 | do | 0 | Do. |
| 11 | Tergitol NPX | ½ | Nonyl phenol polyethylene glycol nonionic | 20 | Poor. |
| 12 | do | 1.0 | do | 60 | Good. |
| 13 | Pluronic L103 | ½ | Polyols | 0 | No good. |
| 14 | do | 1.0 | do | 0 | Do. |
| 15 | Pluronic F68 | ½ | do | 0 | Do. |
| 16 | do | 1.0 | do | 0 | Do. |
| 17 | Pluronic F68LF | ½ | do | 0 | Do. |
| 18 | do | 1.0 | do | 0 | Do. |
| 19 | Pluronic F127 | ½ | do | 0 | Do. |
| 20 | do | 1.0 | do | 0 | Do. |
| 21 | Pluronic L101 | ½ | do | 0 | Do. |
| 22 | do | 1.0 | do | 0 | Do. |
| 23 | Pluronic L61 | ½ | do | 0 | Do. |
| 24 | do | 1.0 | do | 0 | Do. |
| 25 | Pluronic L72 | ½ | do | 0 | Do. |
| 26 | do | 1.0 | do | 0 | Do. |
| 27 | Pluronic L92 | ½ | do | 0 | Do. |
| 28 | do | 1.0 | do | 0 | Do. |
| 29 | Plurcol E300 | ½ | Polyethylene glycol | 0 | Do. |
| 30 | do | 1.0 | do | 0 | Do. |
| 31 | Plurcol E200 | ½ | do | 0 | Do. |
| 32 | do | 1.0 | do | 0 | No good, blended. |
| 33 | Sodium stearate | ½ | Anionic | 9 | No good. |
| 34 | do | 1.0 | do | 0 | Do. |
| 35 | Amm. stearate | ½ | do | 7 | Poor. |
| 36 | do | 1.0 | do | 20 | Do. |
| 37 | Amm. lauryl sulfate | ½ | do | 20 | Do. |
| 38 | do | 1.0 | do | 40 | Fair. |
| 39 | Emcol P1049 | ½ | Alkyl aryl sulfonate anionic | 0 | No good. |
| 30 | do | 1.0 | do | 0 | Do. |
| 41 | Amcol T60 | ½ | Nonyl phenyl ethylene oxide adduct | 10 | Poor. |
| 42 | do | 1.0 | do | 35 | Fair. |
| 43 | Amcol P1059 | ½ | Alkyl aryl sulfonate anionic | 0 | No good. |
| 44 | do | 1.0 | do | 0 | Do. |
| 45 | U.C. L75 | ½ | Nonionic organo-silicone surfactant | 0 | Do. |
| 46 | U.C. L75 | 1.0 | do | 0 | Do. |
| 47 | U.C. L76 | ½ | do | 85 | Very good. |
| 48 | U.C. L76 | 1.0 | do | 100 | Excellent. |
| 49 | U.C. L77 | ½ | do | 100 | Do. |
| 50 | U.C. L77 | 1.0 | do | 100 | Do. |
| 51 | U.C. L78 | ½ | do | 0 | No good. |
| 52 | U.C. L78 | 1.0 | do | 0 | Do. |
| 53 | U.C. L79 | ½ | Cationic quaternary organo silicone | 100 | Excellent.[1] |
| 54 | U.C. L79 | 1.0 | do | 100 | Do.[1] |
| 55 | U.C. L520 | ½ | Organo silicone copolymer surfactant | 100 | Do.[1] |
| 56 | U.C. L520 | 1.0 | do | 100 | Do.[1] |
| 57 | U.C. L522 | ½ | do | 0 | No good. |
| 58 | U.C. L522 | 1.0 | do | 0 | Do. |
| 59 | U.C. L530 | ½ | do | 10 | Do. |
| 60 | U.C. L530 | 1.0 | do | 10 | Do. |
| 61 | U.C. L531 | ½ | do | 80 | Very good. |
| 62 | U.C. L531 | 1.0 | do | 80 | Do. |
| 63 | Atmos 300 | ½ | Mono-diglyceride of fatty acids | 0 | No good. |
| 64 | do | 1.0 | do | 0 | Do. |
| 65 | Arlacel 83 | ½ | Sorbitan sesquioleate | 10 | Do. |
| 66 | do | 1.0 | do | 10 | Do. |
| 67 | Tween 60 | ½ | Polysorbate 60 | 0 | Do. |
| 68 | do | 1.0 | do | 0 | Do. |
| 69 | Span 85 | ½ | Sorbitan trioleate | 0 | Do. |
| 70 | do | 1.0 | do | 0 | Do. |
| 71 | Span 60 | ½ | Sorbitan monostearate | 0 | Do. |
| 72 | do | 1.0 | do | 0 | Do. |
| 73 | Span 65 | ½ | Sorbitan tristearate | 0 | Do. |
| 74 | do | 1.0 | do | 0 | Do. |
| 75 | Prell shampoo | ½ | Detergent | 90 | Very good. |
| 76 | do | 1.0 | do | 100 | Excellent thin film. |
| 77 | do | 2.0 | do | 100 | Do. |

[1] Although classified as excellent, not as good as Alrosol C.

It was found that Alrosol C_{T.M.} at a 1 percent loading produced excellent wetting. It is classified as a detergent and is used in hair conditioning and shampoo compositions. Prell_{T.M.} hair shampoo produced excellent wetting but would have to be ranked lower than Alrosol C as some foaming was noted. In general it was found that the detergent type wetting agents were particularly effective. Silicone urethane surfactants also produced excellent wetting. As can be seen from Table 2, numerous conventional wetting agents did not work or the results were poor with the chemical compositions and loading indicated.

Other compositions of the present invention are illustrated in the following Examples 6 to 14 in Table 3.

aqueous solution is increased to too high a level poor wetting of the substrate results. It is therefore preferred to use up to about 3.0 percent by weight of the gas forming agent based upon the weight of the aqueous solutions of the water soluble materials. As shown in Example 9 in Table 3, hydrogen peroxide was an effective inorganic gas forming agent, however it has a tendency to decompose with time and is therefore not preferred.

With the organic gas forming agents such as the halogenated hydrocarbons an emulsifying agent is used in order to produce an effective mixture of the gas forming agent in the aqueous solution of the water soluble material. This is necessary because these organic gas forming agents do not dissolve in the aqueous solution.

TABLE 3

| Ex. | (1) Water Soluble Material percent by Weight Aqueous Solution | (2) Wetting Agent percent by Wt. Aqueous Solution | (3) Gas Forming Agent percent by Weight of Aqueous Solution | (4) Emulsifying agent percent by Weight Aqueous Solution | (5) Paint Removal at Temp. °F |
|---|---|---|---|---|---|
| 6 | Urea 56% | Alrosol C [2] | 112 Ucon [3] 85 / Methanol 15 } 2% | Lauric acid 0.5 | Excellent 212° F. |
| 7 | do.[1] | Alrosol C 2 | do | do | Do. |
| 8 | do.[1] | Alrosol C 1 | 112 Ucon [3] 85 / Methanol 15 } 4% | do | Poor wtg. because of increase in (3). |
| 9 | Sodium silicate: $SiO_2$ (51.1%) / $Na_2O$ 1.6 | do [2] | Hydrogen peroxide 2 | None | Good. |
| 10 | do | do [2] | 112 Ucon 85 / Methanol 15 } 2% | Lauric acid 0.5 | Fair 190° F. |
| 11 | Sodium silicate: $SiO_2$ (44.1%) / $Na_2O$ 2.5(1 | Tergitol 08, 1 | do | Oleic acid 0.5 | Poor, too thin a coating. |
| 12 | Sodium silicate: $SiO_2$ (37.6%) / $Na_2O$ 3.2:1 | do | do | do | Poor too high $\frac{SiO_2}{Na_2O}$ |
| 13 | Sodium silicate: $SiO_2$ 44.1% / $Na_2O$ 2.0:1 | do | do | do | Excellent |
| 14 | Corn syrup (semi viscous solution) | do | do | do | Do. |

[1] The urea was the ammoniated urea formaldehyde resin of Example 4.
[2] The wetting agents are indicated by trademark and are proprietary materials manufactured by various companies.
[3] Ucon 112 is tetrachloradifluorolethylene manufactured by Union Carbide. An equivalent material is Freon 112 manufactured by Dupont. There are a large number of available chlorinated, fluorinated and brominated hydrocarbons which act as gas forming agents in the temperature range of about 75° F. and 212° F. manufactured by these and other companies.

As can be seen from Table 3, a large variety of water soluble materials can be used in the compositions of the present invention. Sodium silicate is particularly preferred and in general inorganic water soluble materials are preferred because of ease of availability and relatively low cost. As can be seen from Example 4, corn syrup is particularly effective as a water soluble material but it is not preferred because of problems with biodegradation because of bacterial attack on the corn syrup.

In general it was found that the solids concentration of the aqueous solution of water soluble material must be such that it has sufficient viscosity to adhere to the substrate. In general this is easily determined by those skilled in the art. When the water soluble material is sodium silicate it is preferred to use between about 3 to 55 percent by weight of sodium silicate based upon the combined weight of water and sodium silicate. It is preferred that the composition with all the additive materials have a viscosity between about 70 to 3000 centipoises at 68° F.

In general the alkali metal silicates, particularly the sodium silicates, are the preferred water soluble materials for the composition and methods of the present invention. As can be seen from Table 3 in Example 12 when the ratio of silica to alkali is higher then about 3.22 to 1 the results are very poor. In general the silica to alkali ratio should not be less than about 1.6 to 1.

It was found that the wetting agent should be present in an amount between about 0.5 and 3.0 percent by weight based upon the weight of the aqueous solution of the water soluble material. In general these wetting agents are organic.

As can be seen from Example 8 in Table 3 when the percentage of the gas forming agent by weight of the In the case of the halogenated hydrocarbon gas forming agents, it was found that lipophilic emulsifiers such as lauric acid or oleic acid and their esters were particularly effective. It was found that between 0.05 and 2.0 percent of the emulsifying agent based upon the weight of the gas forming agent was effective for this purpose. It was also found that sorbitan monooleate (Emsorb 2500 and 6900_{T.M.}) and sorbitan monolaurate (Emsorb 2515 and 6915_{T.M.}) manufactured by Emery Industries Inc. were also particularly effective as emulsifying agents. The properties of these and other materials as emulsifying agents are well known to those skilled in the art.

The procedure of Examples 1 to 14 was repeated with a wide variety of water soluble materials and it was found that they were in general less effective than the sodium silicate water soluble coating compositions as parting agents. In general it was found that the effectiveness of particular water soluble materials was directly dependent upon their ability to form a gelled, continuous, high density film. It was also found that these water soluble materials exhibited a greater or lesser degree of wetting of a substrate to which they were applied depending upon the thickness of the coat, the nature of substrate and whether or not a wetting agent was present. For thin films, as is necessary for maintaining dimensional tolerances with spray masks, it was found that a wetting agent was necessary in order to form the thin film. The term "thin film" as used herein means that the film is between about 2 to 6 mills thick which produces a coating of the aqueous solution before evaporation of any water of between about 0.02 to 0.04 pound per square foot.

The procedure of Examples 1 to 14 was repeated using numerous kinds of substrates including both organic and inorganic with good results. It was found in general that if the aqueous solution of the water soluble material wetted metals, it would wet substrates composed of other materials.

The compositions of Examples 1 to 14 were used with a large variety of water insoluble coating compositions which would adhere to a particular substrate. It was found that the compositions were equally effective as to all such paint materials and that they did not penetrate the water soluble coating. Such paints include alkyl, epoxy and styrene based paints with a finely divided pigment in a wide variety of colors including both inorganic and organic pigments.

It was also found that the gelled water soluble material coatings of the present invention can be used as parting agents for various molded resin products. In general the method of Example 1 was followed. The action of the gelled water soluble coatings as parting agents was independent of the thickness of the coating of water insoluble material deposited on the water soluble materials. Thus the compositions of the present invention are particularly suited for wide variety of molding operations such as plastic or resin based boats as well as various other molded products.

It was also found that the gelled water soluble material coatings as parting agents were useful in the formation of water insoluble films of varying thickness simply by depositing the film on the flat surface with the gelled water soluble material deposited thereon and allowing the film to cure in situ. In general the procedure shown in FIG. 1 is used except the projection 11 and mask 12 are eliminated in the method. Thus for instance vinyl films can be prepared in this manner by spray depositing the reactive mixture onto the surface of the water soluble coating. Such thin films have found wide application in industry for packaging, diffusion membranes and the like.

In preparing the water soluble material compositions of the present invention as in Examples 1 to 14 it is preferred to mix the wetting agent with the aqueous solution of the water soluble material and, if used, separately mix the gas forming agent with the emulsifying agent by conventional mixing equipment. The two components are mixed together in a single mixer until they are blended together. Care should be taken that the mixing is only sufficient for good blending of the ingredients without introducing air or other gaseous materials into the formulations which would impair the coating ability of the water soluble coating compositions. Equipment for such mixing is well known to those skilled in the art.

Various additive materials were incorporated into the compositions of the present invention in an attempt to retard the gelation time of the water soluble material coatings. Thus for instance small amounts of glycerine and diethylene glycol were used with the sodium silicate without any particularly effective result. Small amounts of various elastomeric materials such as rubber emulsions and the like can be incorporated in the aqueous solutions to retard the gelation time, but in general they are unnecessary and not preferred for the purposes of the present invention.

The water soluble material coatings of the present invention range in hardness from tacky to relatively firm and hard, but in each instance the gell coating contains a considerable amount of water. In general a portion of the water from the aqueous solution is entrapped in the structure of the water soluble materials thus forming a gell like structure. It is for this reason that care must be taken to insure that the water is not completely removed from the water soluble coating and that sufficient water remains in order to retard the penetraion of the water soluble material by paints and the like.

As used herein, the term "parting agent" means that the composition acts to release itself from the surface of a substrate to which the composition is applied, either with or without a water insoluble composition applied in addition on the water soluble material, in the presence of water.

It is intended that the foregoing description only be illustrative of the present invention and it is intended that this invention be limited only by the hereinafter appended claims.

I claim:
1. The method of removably applying a water insoluble composition to the surface of a solid to which the water insoluble composition is adherent which comprises:
   (a) applying an aqueous solution of a water soluble material which wets the solid surface to form a continuous coating and which forms a gelled water soluble coating composition which is a colloidal solution of water in hydrated water soluble material on the surface of the solid upon removal of some of the water;
   (b) removing some of the water from the water soluble material to form the gelled water soluble coating on the solid surface containing sufficient water to retard the penetration of the water soluble material to the surface of the solid by the water insoluble material; and
   (c) applying a water insoluble composition on the water soluble coating composition, the water insoluble composition being removable with water from the surface of the solid by solubilization of the water soluble surface coating.

2. The method of claim 1 wherein the water soluble material is an alkali metal silicate.

3. The method of removably applying a water insoluble surface coating of a paint to a solid surface repellent to the adherence of aqueous solutions the water insoluble coating being adherent to the repellent solid surface, which comprises:
   (a) applying to the repellent solid surface, a water soluble coating composition which comprises an aqueous solution of (1) a water soluble material (2) a wetting agent which promotes the adhesion of the aqueous solution on the repellent solid surface which forms a uniform water soluble gelled coating which is a colloidal solution of water in hydrated water soluble material upon removal of some of the water;
   (b) removing some of the water from the water soluble coating on the repellent solid surface to form the gelled coating on the surface containing sufficient water to retard the penetration of the water soluble material to the surface of the solid by the water insoluble material; and
   (c) applying the water insoluble surface coating on the water soluble coating composition, thereby forming coatings on the repellent solid surface which are removable with water.

4. The method of claim 3 wherein the repellent solid surface is a spray mask template.

5. The method of claim 3 wherein the water soluble material is an alkali metal silicate.

6. The method of claim 3 wherein the repellent surface is a spray mask template with an opening positioned adjacent to a second surface to which the water insoluble coating is to be applied as a spray such that the opening is open for applying the water insoluble surface coating to the second surface but the surfac eof the template is protected by the water soluble coating which is removable by water.

7. The method for the definitive application of an adherent water insoluble coating of a paint to the surface of a substrate with a reusable masking means which comprises:
   (a) providing a substrate which is to be coated on certain portions of the surface with the adherent water insoluble coating through an opening in the reusable masking means;

(b) applying an aqueous solution of a water soluble material and a wetting agent which wets the surface of the masking means to form a continuous coating and removing some of the water to form a gelled coating which is a colliodal solution of water in hydrated water soluble material containing sufficient water to retard the penetration of the water soluble material to the surface of the masking means by the water insoluble material, such that the masking means has a coating about 2 to 6 mils thick.

(c) providing in contact with the substrate the reusable masking means with the opening defining the surface of the substrate to be coated with the water insoluble material, the surface of the masking means being coated with the gelled water soluble coating;

(d) applying the water insoluble coating as a liquid to the substrate through the opening in the masking means and onto the water soluble coating on the masking means so as to provide a definitive application of the water insoluble coating on the surface of the substrate; and (e) contacting the masking means with water to remove the gelled water soluble coating and water insoluble coating from the masking means for reuse.

8. The method of claim 7 wherein the water insoluble coating is applied as a spray through the opening in the masking means to the substrate.

9. The method of claim 7 wherein the water soluble coating material is an alkali metal silicate.

References Cited

UNITED STATES PATENTS

| | | | |
|---|---|---|---|
| 2,426,391 | 8/1947 | Emerson | 118—301 |
| 2,795,206 | 6/1957 | Faber | 118—301 |
| 2,991,188 | 7/1961 | Wing et al. | 106—2 |
| 3,361,110 | 1/1968 | Szczepanski | 118—301 |
| 3,379,173 | 4/1968 | Szczepanski | 118—301 |

FOREIGN PATENTS

| | | |
|---|---|---|
| 844,273 | 8/1960 | Great Britain. |
| 1,084,301 | 9/1967 | Great Britain. |

ALFRED L. LEAVITT, Primary Examiner

M. F. ESPOSITO, Assistant Examiner

U.S. Cl. X.R.

106—2; 117—5.5, 8.5, 38, 104

UNITED STATES PATENT OFFICE
CERTIFICATE OF CORRECTION

Patent No. 3531311          Dated September 29, 1970

Inventor(s) William L. Prior

It is certified that error appears in the above-identified patent and that said Letters Patent are hereby corrected as shown below:

Column 6, line 56 "illustrate" should read --illustrates--

Column 6, lines 61 to 65 "the letter A 23 and 26. In general conventional spray Fig. 3 illustrates a conventional spray mask 22 made illustrated in Figure 3, but in principle their construction is the same" should read --the letters A 23 and 26. In general conventional spray masks are much more detailed than the spray mask 22 illustrated in Figure 3, but in principle their construction is the same. --

Column 8, line 9 "aid" should read --air--

Column 8, line 60 "ing Example 3 also illustrates the particular wetting soluble materials" should read --ing Example 3 also illustrates the particular wetting agents which are effective with sodium silicate water soluble materials. --

UNITED STATES PATENT OFFICE
CERTIFICATE OF CORRECTION

Patent No. 3531311             Dated September 29, 1970

Inventor(s) William L. Prior

It is certified that error appears in the above-identified patent and that said Letters Patent are hereby corrected as shown below:

Column 12, line 14, insert the paragraph --The degree of wetting was determined by observing the area of the dish wetted by the aqueous solution. Excellent wetting was classified as 100 percent dish area wetted at the end of five minutes drainage at the 90 degree angle. The results are set forth in Table 2. --

Table 2 at line 7 "Teigitol 08" should read --Tergitol 08--

Table 2 at line 27 "Plurouic" should read --Pluronic--

Table 2 at line 33 "9" should read --0--

Table 2 at line 40 "30" should read --40--

Table 3, Example 6 (1) "Urea 56%" should read --Urea (Nt. 1) 56%--

Table 3, Example 6 (2) "Alrosol $C^2$" should read --Alrosol C (Nt. 2) 1%--

Table 3, Example 9 (3) "Hydrogen peroxide 2" should read --Hydrogen peroxide 2%--

Table 3, Example 11 (1) $Na_2O$ 25 (1 should read --$Na_2O$ 2.5:1--

UNITED STATES PATENT OFFICE
CERTIFICATE OF CORRECTION

Patent No. 3531311          Dated September 29, 1970

Inventor(s) William L. Prior

It is certified that error appears in the above-identified patent and that said Letters Patent are hereby corrected as shown below:

Table 3, Column 5 Heading "Temp $^6$F" should read --Temp $^\circ$F--

Claim 6, line 64 "eof" should read --of--

SIGNED AND SEALED
DEC 15 1970

(SEAL)
Attest:

Edward M. Fletcher, Jr.
Attesting Officer

WILLIAM E. SCHUYLER, JR.
Commissioner of Patents